United States Patent
Guha et al.

(10) Patent No.: US 11,095,362 B2
(45) Date of Patent: Aug. 17, 2021

(54) MITIGATING INTERFERENCE IN RADIO SYSTEMS

(71) Applicant: Verizon Patent and Licensing Inc., Arlington, VA (US)

(72) Inventors: Ratul K. Guha, Warwick, PA (US); Scott A. Townley, Bridgewater, NJ (US); William H. Stone, Doylestown, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/685,103

(22) Filed: Nov. 15, 2019

(65) Prior Publication Data

US 2021/0152239 A1 May 20, 2021

(51) Int. Cl.
*H04B 7/185* (2006.01)
*H04B 7/155* (2006.01)
*H01Q 3/26* (2006.01)
*H04W 72/08* (2009.01)
*H04W 28/08* (2009.01)

(52) U.S. Cl.
CPC ....... *H04B 7/18539* (2013.01); *H01Q 3/2605* (2013.01); *H04B 7/15585* (2013.01); *H04W 28/08* (2013.01); *H04W 72/082* (2013.01)

(58) Field of Classification Search
CPC ............ H04B 7/15585; H04B 7/18571; H04B 2201/709736; H04B 7/18539; H01Q 3/2605; H04W 72/082; H04W 28/08
See application file for complete search history.

(56) References Cited

U.S. PATENT DOCUMENTS

| | | | |
|---|---|---|---|
| 2001/0019952 A1* | 9/2001 | Ishida | H04W 88/08 455/414.1 |
| 2004/0214577 A1* | 10/2004 | Borst | H04W 16/18 455/446 |
| 2007/0010207 A1* | 1/2007 | Dooley | H04B 17/309 455/67.11 |
| 2012/0307720 A1* | 12/2012 | Madsen | H04B 7/18534 370/316 |
| 2013/0324110 A1* | 12/2013 | Kenington | H04W 24/04 455/423 |
| 2015/0358921 A1* | 12/2015 | Karlsson | H04L 5/0073 370/252 |
| 2015/0358925 A1* | 12/2015 | Nobukiyo | H04W 52/362 455/522 |
| 2016/0241328 A1* | 8/2016 | Kang | H04W 52/146 |
| 2016/0345335 A1* | 11/2016 | Gallien | H04W 52/325 |
| 2017/0272131 A1* | 9/2017 | Ananth | H04W 72/082 |
| 2017/0324604 A1* | 11/2017 | Estevez | H04B 7/0413 |
| 2018/0103381 A1* | 4/2018 | Ramamurthi | H04W 36/20 |
| 2020/0336872 A1* | 10/2020 | Basu Mallick | H04W 4/029 |
| 2021/0003702 A1* | 1/2021 | Weiner | G01S 19/425 |
| 2021/0058146 A1* | 2/2021 | Eichen | H04B 7/18513 |

* cited by examiner

*Primary Examiner* — Raymond S Dean

(57) ABSTRACT

Mitigating interference in 5G new radio systems may include establishing a path loss range associated with a satellite earth station, and receiving a path loss value associated with a mobile device. The method further includes determining whether the path loss value is within the path loss range, and sending a message to the mobile device to change an operation of the mobile device in response to determining that the path loss value is within the path loss range.

20 Claims, 13 Drawing Sheets

MITIGATING INTERFERENCE IN RADIO SYSTEMS

BACKGROUND

Fifth generation (5G) new radio (NR) wireless communications systems operate at frequencies that can overlap with spectrum used by satellite systems which may result in undesirable frequency interference. For example, the 5G standard for wireless communications may operate in a portion of C-band that includes frequencies between about 3700-3900 GHz. Communications links between earth-based satellite stations and satellites may also occupy the C-band frequencies, and include about 3700-4200 GHz for downlink communications, and about 5925-6425 GHz for uplink communications. Out of band transmissions from mobile devices and base stations may impact the downlink communications of satellite earth stations and degrade reception performance.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments are directed to mobile wireless systems and satellite systems which mitigate interference between various network elements while operating in overlapping frequency spectrum(s). Fifth generation (5G) new radio (NR) wireless communications systems operate at frequencies that overlap with spectrum used by satellite systems which may result in undesirable frequency interference.

Figure 1:
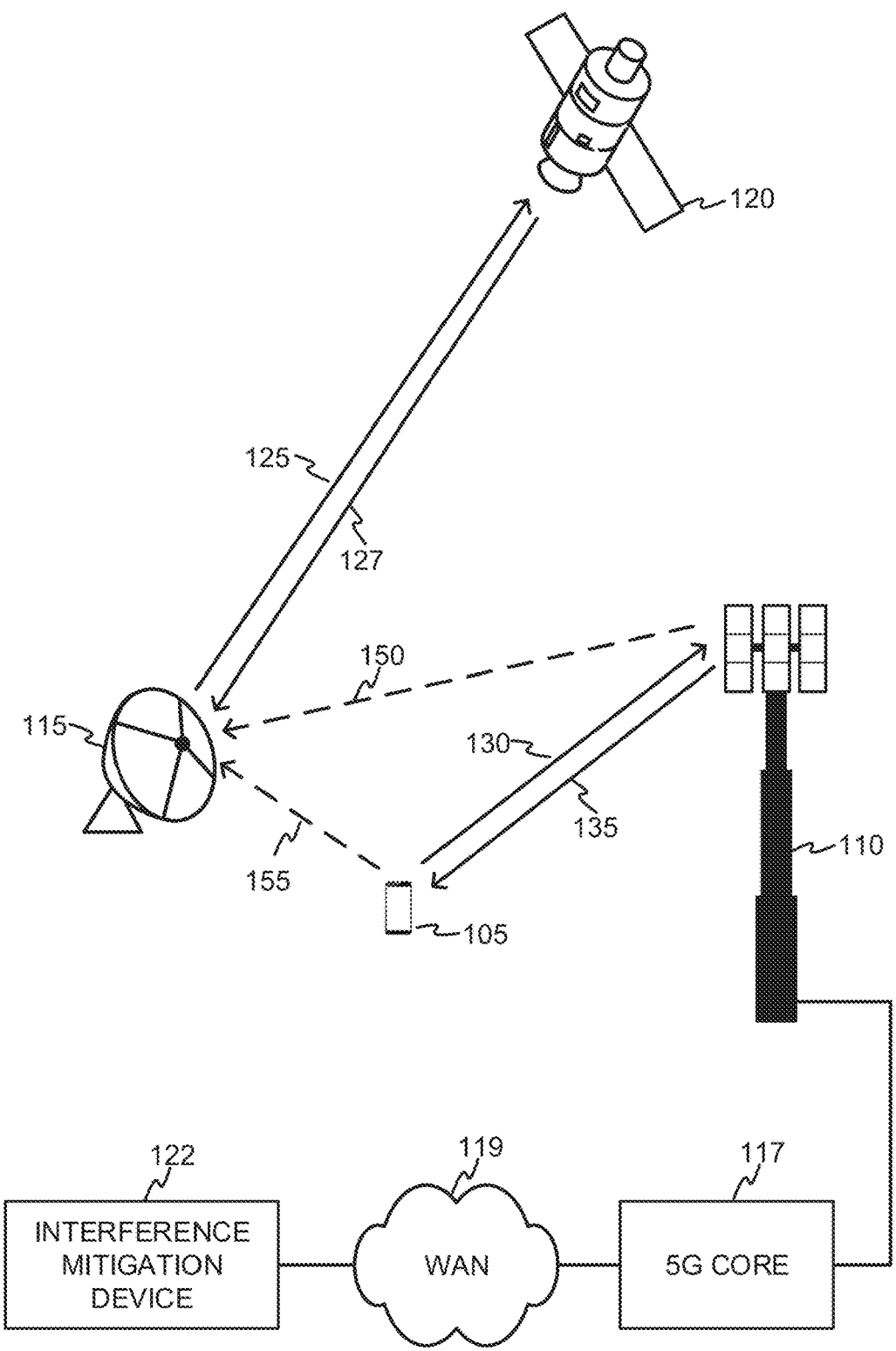
FIG. 1 is a diagram illustrating an exemplary networking environment showing signal interactions between a satellite system and mobile wireless system.

FIG. 1 is a diagram illustrating an exemplary networking environment 100 showing signal interactions between a satellite system and mobile wireless system. The mobile wireless system may include a number of mobile devices and base stations, of which only one mobile device 105 and base station 110 are shown for ease of explanation. The base station 110 may further interface to a 5G core 117 in order to communicate with other network devices within the mobile wireless system and/or external network devices via a wide area network (WAN) 119. WAN 119 may include an interface to an interference mitigation device (IMD) 122 for communications with base station 110 via 5G core 117. The satellite system may include a satellite earth station (SES) 115 and a satellite 120 in earth orbit. Some satellite systems may include a number of satellite system stations and satellites, depending upon the application and functionality of the satellite system.

Included in FIG. 1 are illustrations of a number of signal transmission and reception paths that can be relevant when considering wireless interference of the SES 115 generated by the mobile wireless system. As used herein, the term "path" or "signal path" may be defined as direction for which an electromagnetic signal propagates between wireless communication devices. While the term "path" typically denotes straight line or "line of sight" signal propagation, the term, depending upon context, may also include signal propagations between communication devices resulting from one or more reflections of the electromagnetic signal (e.g., "multi-path"). In FIG. 1, signal paths 125, 127 shown in solid lines between SES 115 and satellite 120 are representative of wireless communication channels used for normal satellite system operations. Signal paths 130, 135 between mobile device 105 and base station 110 are representative of wireless communication channels used for normal mobile wireless system operations. The signal paths 150, 155 shown in dashed lines are representative of wireless interference with SES 115 caused by base station 110 and mobile device 105, respectively.

For example, during normal operation, satellite earth station (SES) 115 may wirelessly transmit signals (e.g., command signals for requesting/specifying content) via satellite uplink 125 to satellite 120. In response, satellite 120 may wirelessly transmit content (e.g., video data) via satellite downlink 127 to SES 115. SES 115 may provide the received content to a user terminal (e.g., a set top box), or provide the received content to a relay station (not shown) for further distribution. During normal operation, mobile device 105 may wirelessly transmit signals via cellular uplink 130 for reception by base station 110. Base station 110 may wirelessly transmit signals via cellular downlink 135 for reception by mobile device 105. During the operation of both systems, SES 115 may receive interference from mobile device 105 and/or base station 110 that could be strong enough to degrade satellite system performance. For example, SES 115 may receive interfering signals from mobile device 105 via interference path 155. The strength of the signals received over interference path 155 may adversely impact the reception of signals received via satellite downlink 127, especially when mobile device is in close proximity to SES 115. In general, as the distance between mobile device 105 and SES 115 decreases, the likelihood of performance degradation from signals received over interference path 155 increases. Additionally or alternatively, SES 115 may receive interfering signals from base station 110 via interference path 150. Because base station 110 transmits signals having greater power than mobile device 105, interference from signals received over interference path 150 may occur over greater distances and/or have a greater impact on satellite system performance than interference from signals received via interference path 155 from mobile device 150.

Figure 5:
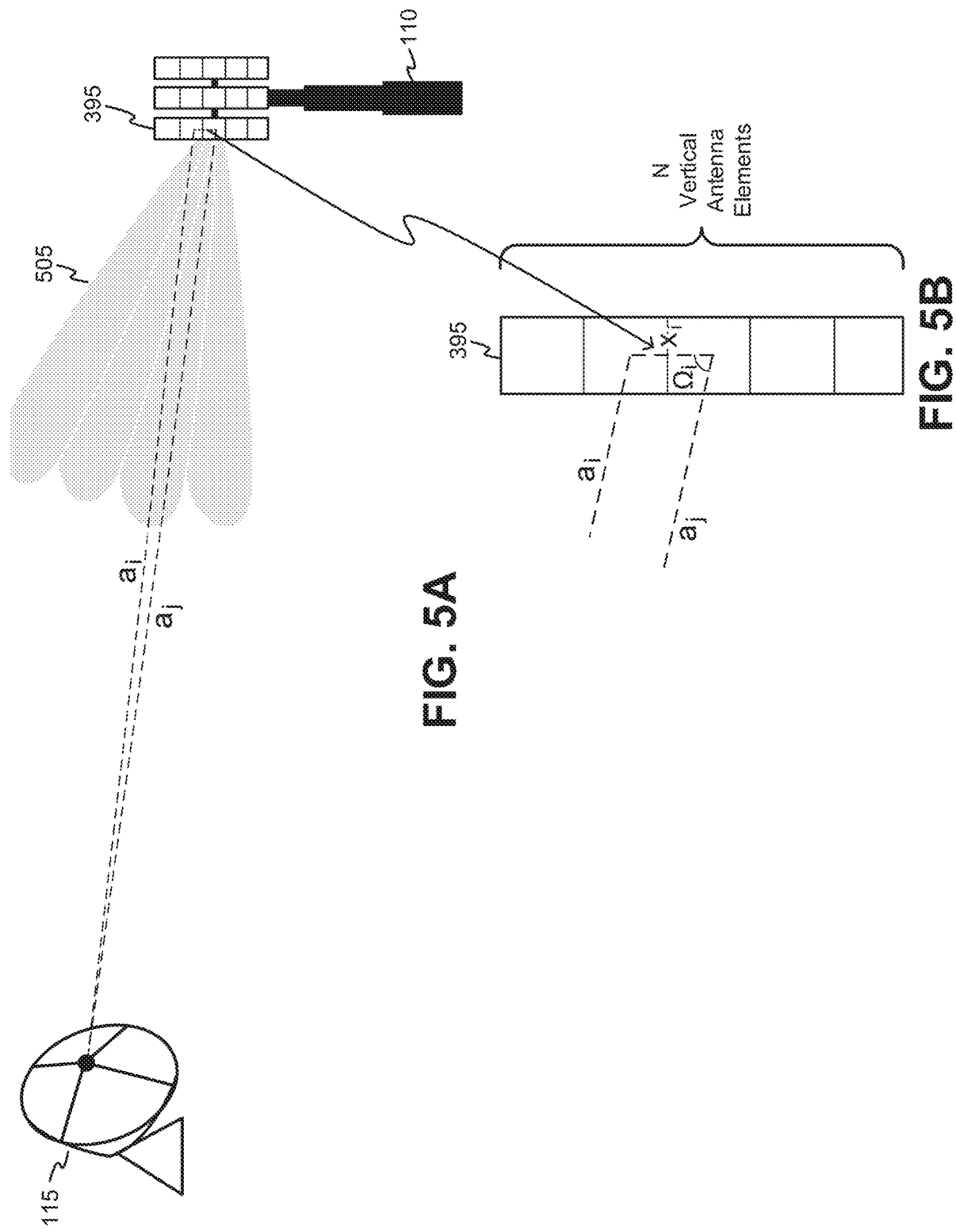
FIGS. 5A and 5B are diagrams depicting an embodiment for mitigating interference between a satellite earth station (SES) and a base station based on beam omission.

Various embodiments presented herein may reduce the level of interference received by SES 115 caused by signals generated by mobile device 105 and/or base station 110. For example, in one embodiment, switching off transmissions from appropriate antenna elements found in base station 110 may reduce interference in satellite system base station 115. The appropriate elements may be determined based on geometric analysis of the beam pointing of base station 110 as described below in relation to FIGS. 5A-6. Additionally, for alternate embodiments, other parameters of the base station 110 antenna, such as, for example, the gain, the beam width, the shape factor, etc., may be adjusted to reduce interference at SES 115.

In another embodiment, beamforming may be used to adjust the transmit pattern of the antenna of base station 110 to form nulls in the direction of SES 115. Directing a null of the transmit antenna pattern of base station 110 would reduce the incident power on the antenna of SES 115, thus mitigating potential interference. By knowing the position and orientation of the antenna on SES 115, the geometric angle to SES 115 relative to base station 110 may be determined, and the radiation amplitude of the antenna on base station 110 may be modified to point the null towards SES 115. Details of an exemplary embodiment using beamforming are described below in relation to FIGS. 7-8.

In another embodiment, base station 110 may send power control adjustment commands to mobile device 105 to reduce transmit power and thus mitigate the interference effects mobile device 105 may have on SES 115. Base station 110 may send these commands when mobile device is within a proximity to SES 115. In an embodiment, base station 110 may determine the proximity based on matching the path loss values received from mobile device 105, and the path loss values determined for SES 115. When the path loss values for mobile device 105 and SES 115 are within a predetermined threshold, base station 110 may determine that mobile device 105 is within a distance close enough to interfere with SES 115. Upon making this determination, base station 110 may reduce the transmit power of mobile device 105 to mitigate interference with SES 115, and while maintaining sufficient signal strength from mobile device 105 to perform wireless communications within acceptable error rates. Details of an exemplary embodiment using power control adjustment are described below in relation to FIGS. 9-10.

In another embodiment, base station 110 may send load balancing commands altering the operation of mobile device 105 in order to reduce interference with SES 115. For example, when mobile device 105 is within a proximity to SES 115, base station 110 may send a "release and redirect" command to change the frequency band of operation of mobile device 105. In an embodiment, base station 110 may determine the proximity based on matching the path loss values received from mobile device 105, and the path loss values determined for SES 115. When the path loss values for mobile device 105 and SES 115 are within a predetermined threshold, base station 110 may determine that mobile device 105 is within a distance close enough to potentially interfere with SES 115. Upon making this determination, base station 110 may send load balancing commands to mobile device 105 in order to mitigate interference with SES 115. Details of an exemplary embodiment using load balancing commands are described below in relation to FIGS. 11-12.

Mobile device 105 and/or base station 110 may operate in accordance with any suitable network standard, and may include a plurality of networks of any type. Base station 110 thus may support one or more types of wireless access networks and one or more back end networks (not shown). Wireless access networks support the mobile system uplink 130 and downlink 135 to provide wireless connectivity between mobile device 105 and other network elements within wireless access network and/or devices connected to the back-end network. The wireless network may include any type of wireless network, such as, for example, a telecommunications network wireless local area network(s) (LAN) (e.g., WiFi), wireless wide area networks (WAN) (e.g., WiMax), and/or one or more wireless public land mobile networks (PLMNs). The PLMN(s) may include 5G systems, which may operate at higher frequencies, such as, for example, about 28 GHz, a Global System for Mobile Communications (GSM) PLMN, a Long Term Evolution (LTE) PLMN, and Advanced LTE PLMN, and/or other types of PLMNs not specifically described herein. The back-end network may exchange data with the wireless access network(s) to provide mobile device 105 connectivity to various servers, gateways, etc. The back-end network may include a wide area network (WAN), a metropolitan area network (MAN), an intranet, the Internet, a wireless satellite network, a cable network (e.g., an optical cable network), etc.

The satellite system may include one or more SES's 115 and one or more satellites 120 in earth orbit. Some satellite systems may include a number of satellite system stations and satellites, depending upon the application and functionality of the satellite system. SES 115 may use a mechanically and/or an electronically controlled antenna, which may include a dish antenna, or an antenna array to communicate with one or more satellites 120. SES 115 may receive digital content such as, for example, video data for viewing by a single user and/or video data for redistribution to a plurality of users.

Fifth Generation (5G) core 117 may be a new radio (NR) core networking infrastructure that provides mobility management, session management, broadcast/multicast functionality, authentication, and/or packet transport to support mobile device 105 and base station 110 for wireless communication. 5G core 117 may be compatible with 5G NR wireless communications standards. Additionally or alternatively, various embodiments may use other networking cores compatible with known wireless communication standards which may include, for example, LTE, LTE Advanced, Global System for Mobile Communications (GSM), Universal Mobile Telecommunications System (UMTS), IS-2000, etc.

WAN 119 may include any type of wide area network, a metropolitan area network (MAN), an optical network, a video network, a satellite network, an intranet, or a combination of networks. Some or all of WAN 119 may be managed by a provider of communication services that also manages the satellite system and/or mobile wireless system. WAN 140 may allow the delivery of IP and/or non-IP services to/from mobile device 105, and/or base station 110, and may interface with other external networks. WAN 140 may include one or more server devices and/or network devices, or other types of computation or communication devices.

Interference mitigation device (IMD) 122 may interface to 5G core 117 via WAN 112. Additionally, or alternatively, IMD 122 may be communicate with 5G core via a direct connection and/or a local area network (LAN). In yet another embodiment, IMD 122 may be included in 5G core 117 as a network function or virtual network function (VNF). Through 5G core 117, IMD 122 may provide to base station 110 path loss values for paths between SES 115 and base station 110, and/or path loss values between mobile device 105 and SES 115.

In more detail, IMD 122 may be any type of networking device that receives information regarding SES 115, mobile device 105, and/or base station 110, and calculates path loss values for designated wireless paths associated with SES 115 and other devices in networking environment 100 (e.g., base station 110, mobile device 105, etc.) based on propagation analysis. The received information may include, for example, the positions of base station 110 and/or SES 115 in a standard reference frame (e.g. rectangular coordinates, latitude, longitude, altitude, etc.); base station 110 and/or SES 115 antenna parameters which may include, for example, pointing angles (e.g., azimuth and elevation), antenna beam width, side lobe level, antenna pattern (azimuth and elevation); signal parameters such as center frequency, bandwidth, etc. While mobile device 105 may have the capability to independently determine path loss values and report these values to base station 110, in alternate embodiments, IMD 122 may receive various inputs regarding mobile device 105 (e.g., antenna parameters, position, orientation, antenna pointing direction, etc.) and compute path losses (e.g., for paths between base station 110 and/or SES 115) based on propagation analysis.

Further regarding FIG. 1, once interference mitigation device 122 calculates a path loss value, the values may be provided to base station 110 for use in interference mitigation as described herein with reference to FIGS. 5A through 13. In an embodiment, the calculated path loss values may be provided to base station 110 via WAN 119 and/or 5G core 117. Accordingly, IMD 122 may be implemented as a general processor-based system executing software (e.g., a server or other network element), or embodied using dedicated hardware (e.g., ASICs, FPGAs, etc.), or as a combination thereof. Details of an embodiment of IMD 122 are discussed below in reference to FIG. 4.

Figure 2:
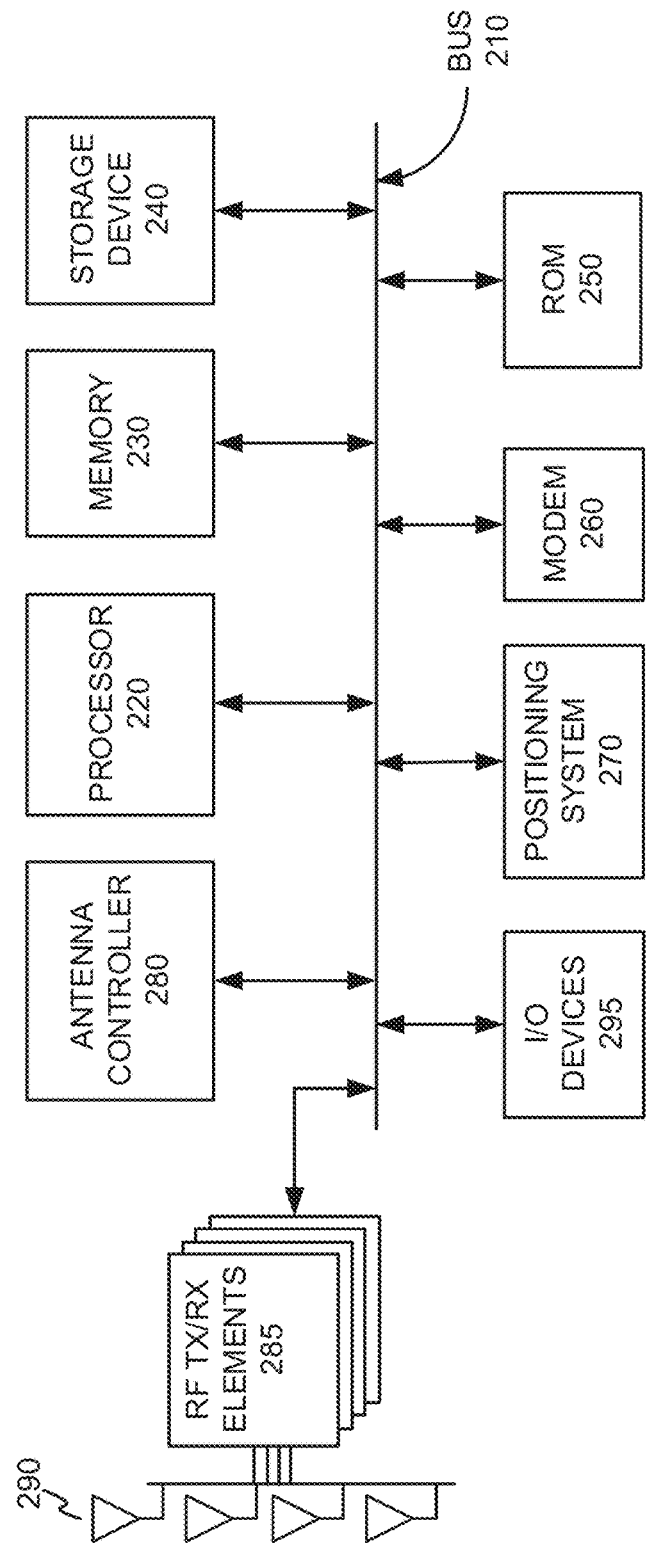
FIG. 2 is a block diagram showing exemplary components of a mobile device according to an embodiment.

FIG. 2 is a block diagram showing exemplary components of mobile device 105 according to an embodiment. Mobile device 105 may include any type of electronic device having communication capabilities, and thus communicate over networks using a variety of different channels, including channels having wired and/or wireless connections. Mobile device 105 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, or a digital camera that includes communication capabilities (e.g., wireless communication mechanisms). Further referring to FIG. 2, mobile device 105 may include bus 210, processor 220, memory 230, storage device 240, ROM 250, modem 260, positioning system 270, antenna controller 280, radio frequency transmit/receive RF TX/RX elements 285, antenna array 290, and I/O devices 295. Bus 210 may interconnect each of the components of mobile device 105 either directly or indirectly to exchange commands and/or data.

Processor 220 may include a processor, microprocessor, or processing logic that may interpret and execute instructions. Memory 230 may include a random-access memory (RAM) or another type of dynamic storage device that may store information and instructions for execution by processor 220. Storage device 240 may include a persistent solid state read/write device, a magnetic, and/or optical recording medium and its corresponding drive. ROM 250 may include a ROM device or another type of static storage device that may store static information and instructions for use by processor 220.

Modem 260 may perform various communications and signal processing operations allowing for mobile device 105 to efficiently communicate over a network. Modem 260 may perform operations for data exchange via a 5G network, which may include, for example, signal conditioning (e.g., filtering), signal encoding and decoding (e.g., orthogonal frequency division multiplexing), signal modulation and demodulation (e.g., binary phase shift keying, quadrature amplitude modulation, etc.), and/or error correction for data being transferred over the access stratum. Modem 260 may also operate in the non-access stratum and thus facilitate signaling and coordination with network devices in wireless access network to manage the establishment of communication sessions and for maintaining continuous communications.

Positioning system 270 may include a variety of receivers, sensors, and/or processors to provide relative and/or absolute position and orientation data of mobile device 105. For example, positioning system 270 may include a satellite navigation system, such as, for example, global positioning system (GPS) component, which may provide position information in relation to a standard reference frame. Position information may include rectangular coordinates in the world geodetic system 1984 (WGS84) frame (in either two or three dimensions), geodetic coordinates such as latitude, longitude, and altitude, and/or other suitable positioning data. In another embodiment, positioning system may include an internal measurement unit (IMU) to determine relative displacements based on measured accelerations, and/or gyroscopes to measure angular displacements such as the roll, pitch, and yaw of the mobile device. Positioning system 270 may further include sensors, such as magnetometers, which may be used to determine orientation in a reference frame, such as, for example, the angular orientations with respect to magnetic and/or true north.

Antenna controller 280 may accept data for transmission from processor 220 and/or modem 260, and perform TX MIMO encoding to produce multiple channels of data for a set of the antenna elements in antenna array 290, which may be transmitted over uplink channel 130. Signals which have been received over downlink channel 130 via antenna array 290 may be decoded using RX MIMO decoding to combine streams into fewer data channels or a single received channel. Antenna controller 280 may further apply beamforming weights (which perform relative phase, frequency, and amplitude modulations between the antenna elements) on the transmit data streams to electronically adjust the transmit antenna pattern. Additionally, antenna controller 280 may apply beamforming weight to the receive data streams to electronically adjust the receive antenna pattern. Such adjustments may include main lobe pointing (the antenna pattern's main lobe may also be referred to herein as the "antenna beam," the "beam," or the "main beam"). Other adjustments may include "forming nulls" which may include pointing side lobe nulls in a particular direction and/or changing the side lobe pattern to alter the placement and/or depth of antenna pattern nulls.

RF TX/RX elements 285 may include discreet RF elements to amplify, frequency demodulate (e.g., down convert) analog channels received over antenna array 290, and convert the analog channels to received digital streams using analog to digital converters. The received digital streams may be passed to antenna controller 280 which may further perform RX MIMO processing to combine MIMO streams. RF TX/RX elements 285 may further process transmit digital streams, which may be TX MIMO encoded by antenna controller 280 prior to being converted to analog signals using digital to analog converters. The analog signals may be frequency upconverted and amplified for transmission by RF TX/RX elements 285, and subsequently radiated by antenna array 290 to form uplink 130.

Antenna array 290 may include at least two antenna elements which have independent channels that may be used for electronic adjustments of both the transmit and receive antenna patterns, and/or also for transmit and/or receive MIMO processing to improve wireless channel reliability and/or throughput.

I/O devices 295 may include one or more mechanisms that permit an operator to input information to mobile device 105, such as, for example, a keypad or a keyboard, a microphone, voice recognition and/or biometric mechanisms, etc. I/O devices 295 may also include one or more mechanisms that output information to the operator, including a display, a speaker, etc.

Mobile device 105 may perform certain operations or processes, as may be described in detail below. Mobile device 1050 may perform these operations in response to processor 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium, such as storage device 240, or from another device via the network. The software instructions contained in memory 240 may cause processor 220 to perform operations or processes that are described below. Alternatively, hardwired circuitry may be used in place of or in combination with software instructions to implement processes consistent with the principles of the embodiments. Thus, exemplary implementations are not limited to any specific combination of hardware circuitry and software.

The configuration of components of mobile device 105 illustrated in FIG. 2 is for illustrative purposes only. It should be understood that other configurations may be implemented. Therefore, mobile device 105 may include additional, fewer and/or different components than those depicted in FIG. 2.

Figure 3:
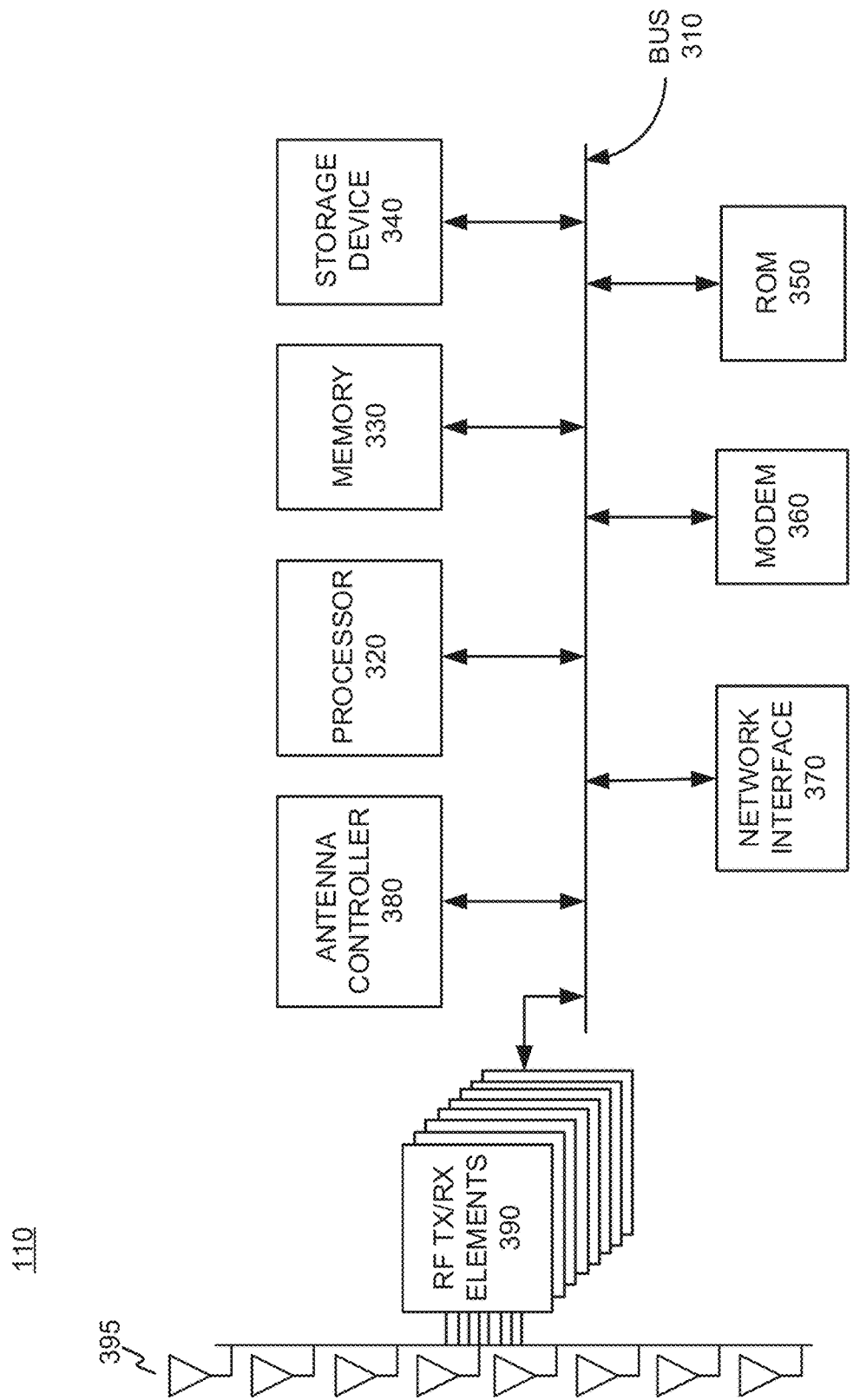
FIG. 3 is a block diagram showing exemplary components of base station according to an embodiment.

FIG. 3 is a block diagram showing exemplary components of base station 110 according to an embodiment. Base Station 110 may provide wireless access to mobile device 105 using various wireless protocols, such as, for example, 3GPP 5G, LTE, LTE Advanced, etc. Base station 110 may further provide wireless and/or wireless network connectivity to other devices connected to evolved Packet Core (ePC) (through, for example, a backhaul network), and network devices connected to wide area networks (e.g., the Internet). Base station 110 may include a processor 320, a memory 330, a storage device 340, a ROM 350, a modem 360, a network interface 370, RF TX/RX elements 390, and an antenna array 395. The components of base station 110 may interface (either directly or indirectly) to a bus 310 to exchange data.

Processor 320 may include one or more processors, microprocessors, application specific integrated circuits (ASICs), field programmable gate arrays (FPGAs), and/or other processing logic that may interpret and execute instructions and/or low-level logic. Processor 320 may control operation of base station 110 and its components. Memory 330 may include a random access memory (RAM) or another type of dynamic storage device to store data and instructions that may be used by processor 320. Storage device 340 may include a persistent solid state read/write device, a magnetic, and/or optical recording medium and its corresponding drive. ROM 350 may include a ROM device or another type of static storage device that may store static information and instructions for use by processor 320.

Modem 360 may perform various communications and signal processing operations allowing for base station 110 to efficiently communicate over the wireless network. Modem 360 may also perform processing to facilitate communications over the back-haul network. Modem 360 may perform signal conditioning (e.g., filtering), signal encoding and decoding (e.g., OFDMA), signal modulation and demodulation (e.g, BPSK, M-PSK, M-QAM, etc.), and/or error correction for data being transferred over the access stratum. Modem 360 may also operate in the non-access stratum and thus facilitate signaling and coordination with network devices in wireless access network to manage the establishment of communication sessions and for maintaining continuous communications. The modem and processor may function together facilitate the operations of base station 110 in accordance with a variety of wireless and/or wired communication protocols.

Network interface 370 may include a logical component that includes input and/or output ports, input and/or output systems, and/or other input and output components that facilitate the transmission of data to other devices via the backhaul network. Such devices may include databases which store information about satellite system(s), such as, for example, parameters associated with satellite base station 115 and/or satellite 120, which may be accessed to obtain information for mitigating interference. Network interface 370 may include a network interface cards (e.g., Ethernet card) for wired communications and/or a wireless network interface (e.g., a WiFi) card for wireless communications and/or microwave interfaces for communications with other base stations and/or the backhaul network. Such communication standards may include, for example, local area network(s) (LAN) (e.g., WiFi), wireless wide area networks (WAN), and/or one or more wireless public land mobile networks (PLMNs). The PLMN(s) may include 5G systems, which may operate at higher frequencies, such as, for example, about 28 GHz, a Global System for Mobile Communications (GSM) PLMN, a Long Term Evolution (LTE) PLMN, and Advanced LTE PLMN, and/or other types of PLMNs not specifically described herein. The back-end network may exchange data with the wireless access network(s) to provide access to various servers, gateways, etc. The back-end network may include a wide area network (WAN), a metropolitan area network (MAN), an intranet, the Internet, a wireless satellite network, a cable network (e.g., an optical cable network), etc.

Antenna controller 380 may accept data and/or commands (e.g. pointing/beamforming commands) from processor 320 and/or modem 360. Antenna controller may perform TX MIMO encoding to produce multiple channels of data, for a set of the antenna elements in antenna array 395, which may be transmitted over downlink channel 135. Signals which have been received over uplink channel 130 via antenna array 395 may be decoded using RX MIMO decoding to combine streams into fewer data channels or a single received channel. Antenna controller 380 may further apply beamforming weights (which perform relative phase, frequency, and amplitude modulations between the antenna elements) on the transmit data streams to electronically adjust the transmit antenna pattern. Additionally, antenna controller 380 apply beamforming weights on the receive data streams to electronically adjust the receive antenna pattern. Such adjustments may include main lobe pointing. Other adjustments may include "forming nulls." Forming nulls may include pointing side lobe nulls in a particular direction and/or changing the side lobe pattern to alter the placement and/or depth of antenna pattern nulls. In various embodiments, the beamforming weights may be incorporated into a precoding matrix that may be used for other processing, such as, for example, MIMO processing.

RF TX/RX elements 390 may include discreet RF elements to amplify, frequency demodulate (e.g., down convert) analog channels received via uplink 130 through antenna array 395, and convert the analog channels to received digital streams using analog to digital converters. The received digital streams may be passed to antenna controller 380 which may further perform RX MIMO processing to combine MIMO streams. RF TX/RX elements 390 may further process transmit digital streams, which may be TX MIMO encoded by antenna controller 380 prior to being converted to analog signals using digital to analog converters. The analog signals may be frequency upconverted and amplified for transmission at RF TX/RX elements 390, and subsequently radiated by antenna array 395, forming downlink 135.

Antenna array 395 may include a plurality of antenna elements in order to serve multiple sectors and/or to provide various antenna characteristics (e.g., antenna beam width, gain, side lobe control, etc.) appropriate for base station 110 operations. The antenna elements may have independent channels that may be used for electronic adjustments of both the transmit and receive antenna patterns, and/or also for transmit and/or receive MIMO processing to improve wireless channel reliability and/or throughput. In an embodiment, elements in antenna array 395 may be "grouped" (though physical and/or electronic arrangement) and designated for communication with mobile devices within a particular sector of base station's 110 overall coverage. The sector may be divided into angular segments (measured in a horizontal plane) pointing in different directions in order to distribute coverage for base station 110. For example, elements in antenna array 395 may be grouped in a triangular arrangement so each side of the triangle serves a 120-degree sector. The antenna pattern, generated by the antenna elements associated with a particular sector, may be characterized by angles (e.g., azimuth and elevation) defined by a sector reference direction for the sector. The sector reference direction may be specified by a vector extending from a reference point associated with the sector.

As described herein, base station 110 may perform certain operations in response to processor 320 and/or modem 360 executing software instructions contained in a computer-readable medium, such as memory 330. A computer-readable medium may be defined as a non-transitory memory device. A non-transitory memory device may include memory space within a single physical memory device or spread across multiple physical memory devices. The software instructions may be read into memory 330 from another computer-readable medium or from another device via network interface 370. The software instructions contained in memory 330 may cause processor 320 to perform processes, in total or in-part, as described in FIGS. 6, 8, 10, 12 and/or 13. Alternatively, hardwired circuitry may be used in place of, or in combination with, software instructions to implement processes described herein. Thus, implementations described herein are not limited to any specific combination of hardware circuitry and software.

Although FIG. 3 shows example components of base station 110, in other implementations, base station 110 may include fewer components, different components, differently arranged components, or additional components than those depicted in FIG. 3. Additionally or alternatively, one or more components of base station 110 may perform the tasks described as being performed by one or more other components of base station 110.

Figure 4:
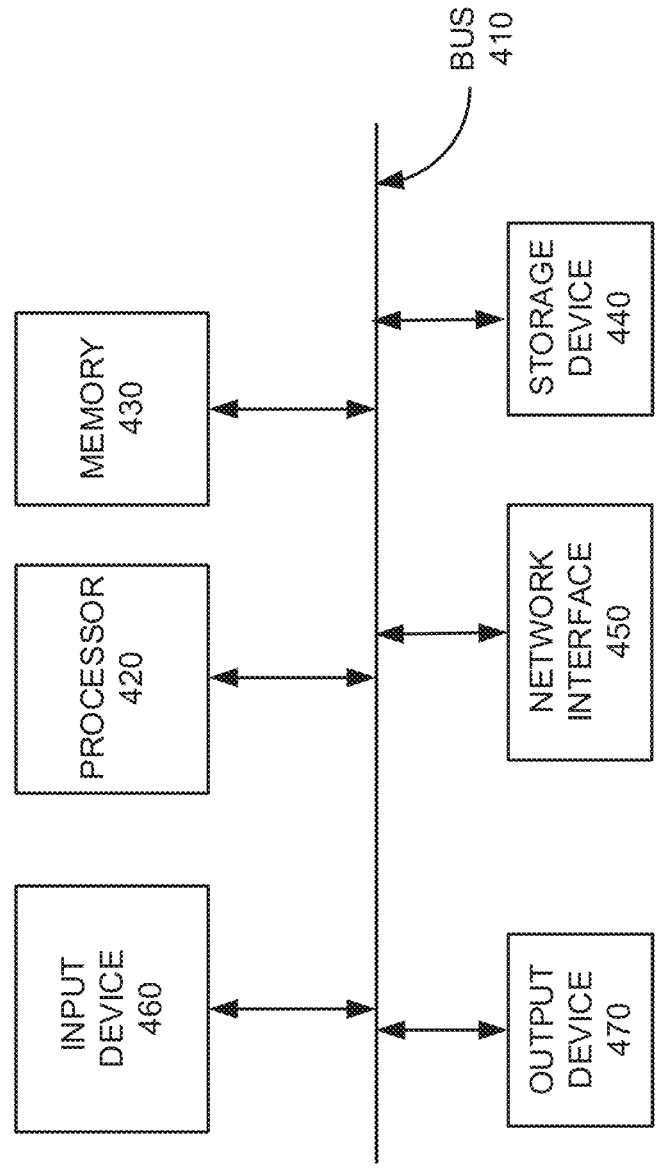
FIG. 4 is a block diagram showing exemplary components of a network device configured as an interference mitigation device according to an embodiment.

FIG. 4 is a block diagram showing exemplary components of a network device 400 according to an embodiment. Network device 400 may be embodied as IMD 122 as a single device as shown in FIG. 4 in a "stand-alone" implementation, which may be external to 5G core 117. In other embodiments, there may be a plurality of network devices 400 providing functionality of IMD 122. Alternatively, in other embodiments, IMD 122 may reside in 5G core 117 as one or more separate devices, or may be implemented along with various existing network functions in 5G core 117. Network device 400 may include a bus 410, a processor 420, a memory 430, storage device 440, a network interface 450, input device 460, and an output device 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux operating systems. Processor 420 may also use high-level analysis software packages and/or custom software written in any programming and/or scripting languages for interacting with other network entities that are communicatively coupled to enterprise network 120.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with mobile devices 110.

Network interface 450 may include a transceiver that enables network device 400 to communicate with other devices and/or systems in network environment 100. Network interface 450 may be configured to exchange data with enterprise network 120 over wired communications (e.g., conductive wire, twisted pair cable, coaxial cable, transmission line, fiber optic cable, and/or waveguide, etc.), or a combination of wireless. In other embodiments, network interface 450 may interface with enterprise network 120 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, network device 400 may perform certain operations relating to mitigating wireless interference of SES 115 caused by mobile wireless systems. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process, in total or in-part, as exemplified by the flow charts shown in FIGS. 6, 8, 10, 12 and/or 13.

Although FIG. 4 shows exemplary components of network device 400, in other implementations, network device 400 may include fewer components, different components, additional components, or differently arranged components than depicted in FIG. 4.

FIGS. 5A and 5B are diagrams depicting an embodiment for mitigating interference with SES 115 from base station 110 using beam omission. As shown in FIG. 5A, wireless signals transmitted by base station 110 via one or more antenna beams (from the group of antenna beams 505) may cause interference with SES 115. In an embodiment, a geometrical calculation may be performed to determine which (if any) antenna beam(s) point towards SES 115. Upon determining which antenna beam(s) point to SES 115, base station 110 can deactivate (or "omit") those antenna beam(s) from the group of antenna beams 505 that transmit signals. The determination of which antenna beams to deactivate may be made on a sector basis for base station 110. The embodiment may use a geometric model that is based on knowing the position of SES 115, thus the distances computed in the geometric model are independent of path loss (i.e., path loss normalized). In one embodiment, the geometrical calculation may include determining an angle $\Omega$ to SES 115 from base station 110, based on knowing the position of SES 115. The angle $\Omega$ may be defined as the angle from a line defined by a pair of antenna elements in the antenna of base station 110, to a line connecting one of the pair of antenna elements to the SES 115 (this line may also be known as a "line of sight" to SES 115). Once the angle $\Omega$ is determined, any antenna beams pointing at angle $\Omega$ (or within a predetermined tolerance thereof) may be turned off to mitigate interference as SES 115.

The angle $\Omega$ may be an average of angles $\Omega_1, \Omega_2, \ldots, \Omega_{N-1}$ to SES 115 that are measured between lines of sight $a_1, a_2, \ldots, a_N$ pointing to SES 115 from N elements in antenna array 395, and the lines $x_i$ (where i=1, ..., N−1) between pairs of elements in antenna array 395 as shown in FIG. 5B (where only $a_i$ and $a_j$ are shown for ease of illustration). The line $x_i$ may be from pairs of adjacent antenna elements as shown in FIG. 5B. However, in other embodiments, the antenna element pairs do not have to be adjacent. The angle $\Omega$ may be calculated using the following formula:

$$\Omega = \text{Avg}[\cos^{-1}((a_i^2 - a_j^2)/2a_j x_i)] \qquad (1).$$

In Equation (1) above, Avg indicates an average of angles $\Omega_1, \Omega_2, \ldots \Omega_{N-1}$ associated with N antenna elements; $a_i$ is the distance between SES 115 and the $i^{th}$ antenna element; $a_j$ is the distance between SES 115 and the $j^{th}$ antenna element; and $x_i$ is the distance between the $i^{th}$ antenna element and the $j^{th}$ antenna element.

Once angle $\Omega$ is determined, antenna beams pointed within a predetermined angular range (e.g., threshold) of $\Omega$ may be turned off to mitigate interference with SES 115. While FIGS. 5A and 5B show angle $\Omega_i$ in a vertical plane corresponding to vertical elements in antenna array 395, other embodiments may include calculating $\Omega_i$ in a different plane (e.g., horizontal) depending upon the configuration of the elements in antenna array 395. For example, if the elements in antenna array 395 are configured in a horizontal dimension (as opposed to vertical dimension as shown in FIGS. 5A and 5B), angle $\Omega$ may be measured in a horizontal plane.

Figure 6:
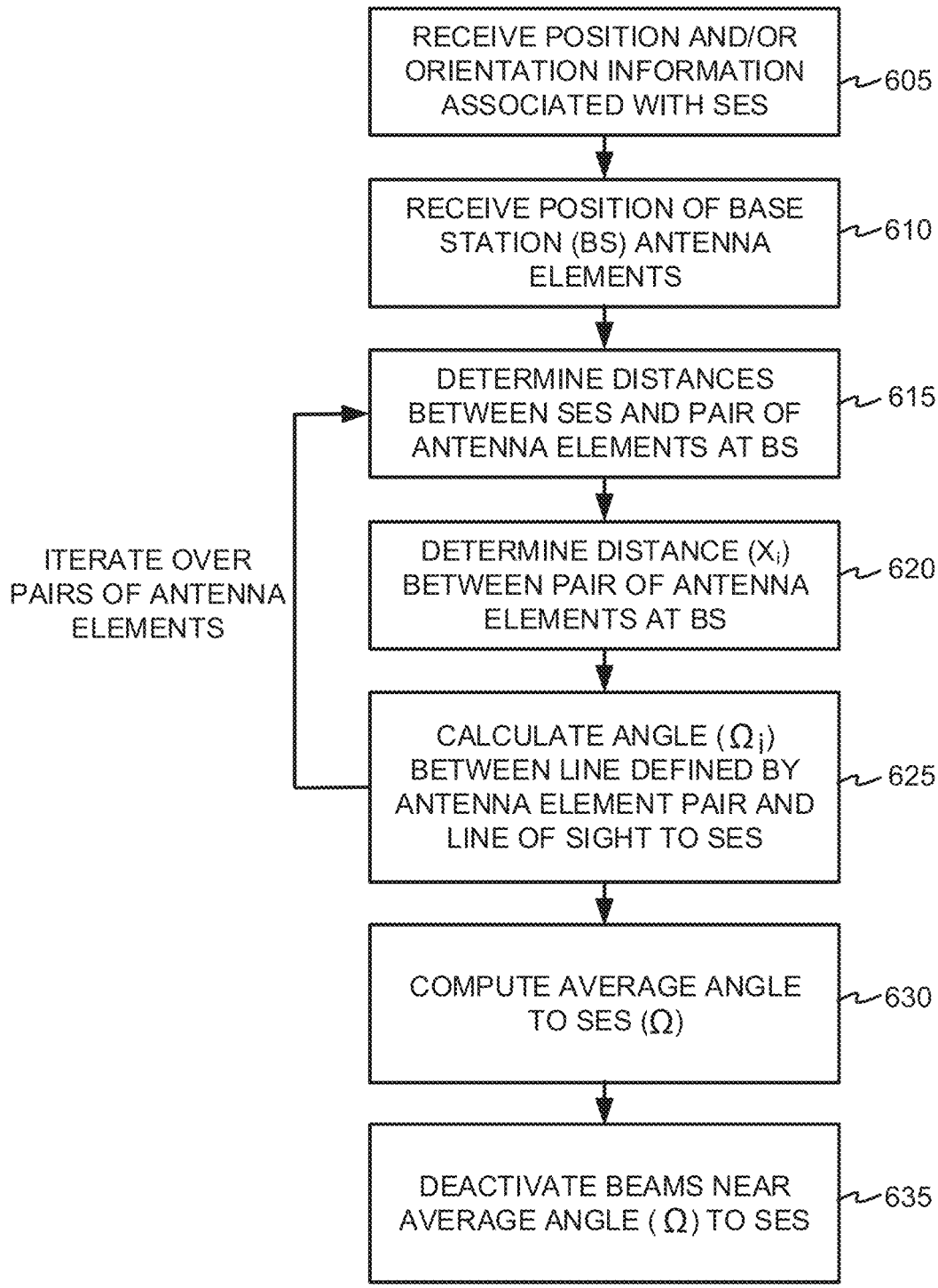
FIG. 6 is a flow chart showing an exemplary process for mitigating SES interference using beam omission.

FIG. 6 is a flow chart of an exemplary process 600 for mitigating interference with SES 115 from base station 110 using beam omission. In an embodiment, process 600, or portions thereof, may execute on processor 320 residing in base station 110. Additionally or alternatively, process 600, or portions thereof, may execute on processor 420 residing in IMD 122 unless specifically stated otherwise in FIG. 6. As shown in FIG. 6, a processor 320/420 may receive position and/or orientation information associated with SES 115 (Block 605). The position may include coordinates of SES 115 in a standard coordinate system (e.g., WGS84). The orientation may include the attitude (e.g., multi-dimensional pointing) of the dish antenna associated with SES 115. Processor 320/420 may then receive and/or calculate the position of base station 110 antenna elements (B610) in the standard coordinate system. The position of the antenna elements may be determined by knowing a reference point on base station 115 in the standard coordinate system, and then adding position offsets from the reference point to each antenna element (e.g., the antenna phase center of each antenna element).

Further referring to FIG. 6, processor 320/420 may then determine two distance values (e.g., $a_i$ and $a_j$) between SES 115 and a pair of antenna elements (B615). Processor 320/420 may then determine the distance ($x_i$) of a line between the pair of antenna elements at base station 110

(Block 620). The antenna elements used to compute the distance ($x_i$) may be adjacent antenna element pairs, or non-adjacent antenna element pairs. Processor 320/420 may then calculate the angle WO from the line between the antenna element pair (having distance $x_i$), to the line of sight ($a_j$) (Block 625). Block 615 through Block 625 may be iterated over the pairs of elements in antenna array 395. Processor 320/420 may then compute an average of angles $\Omega_1, \Omega_2, \ldots \Omega_{N-1}$ to obtain the average angle to SES 115 ($\Omega$) (Block 630). Once average angle to SES 115 ($\Omega$) is determined, processor 320 and/or antenna controller 380 in base station 110 may deactivate antenna beams pointing near (i.e., within a predetermined tolerance) average angle to SES 115 ($\Omega$) (Block 635).

Figure 7:
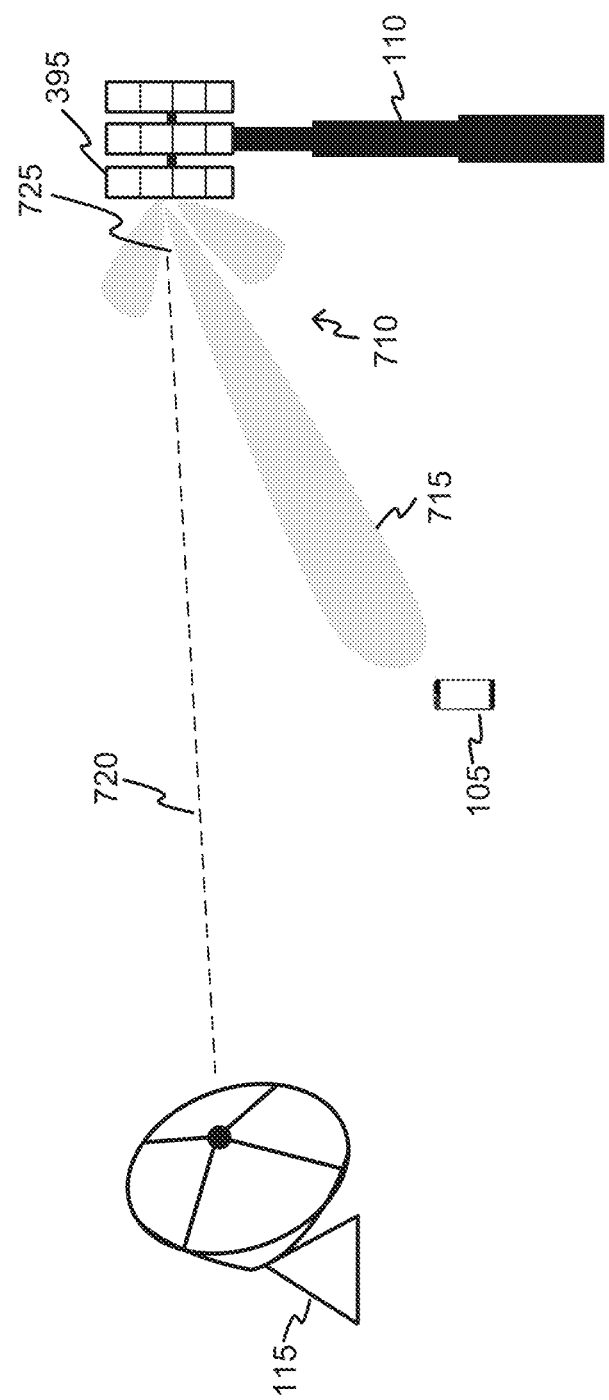
FIG. 7 is a diagram depicting an embodiment for mitigating interference between an SES and a base station based on zero forcing.

FIG. 7 is a diagram depicting an embodiment mitigating for interference with SES 115 from base station 110 using zero forcing. Zero forcing relies on base station 110 reducing the antenna gain in the direction of SES 115 by steering and/or forming a null (hereinafter described as "nulling") in the antenna pattern towards the direction of SES 115. Beamforming techniques may be used by base station 110 for nulling the transmit antenna pattern towards the direction of SES 115, and thus reducing the incident power on SES 115 to mitigate interference caused by base station 110.

In more detail, as shown in FIG. 7, base station 110 may use beamforming to control antenna pattern 710 which is formed by antenna array 395. Beamforming may be used to steer a main lobe 715 of antenna pattern 710 towards mobile device 105 for increasing signal gain to improve communications with mobile device 105. Base station 110 may also use beamforming to create and/or steer a null 725 of antenna pattern 710 in a direction along a line of sight 720 to SES 115 for interference mitigation. Line of sight 720 may be computed, prior to communications operation, by base station 110 or by IMD 122, as the position and/or antenna attitude of SES 115 is known. For example, the position of SES 115 and base station 110 may be provided in the form of coordinates in a standard coordinate system (e.g., WGS84), or by relative coordinates with respect to base station 110. For example, relative coordinates may be based on spherical coordinates which may include the distance along line of sight 720, an elevation angle (an angle measured in a vertical plane relative to base station 110), and an azimuth angle (an angle measured in a horizontal plane relative to base station 110). In another embodiment, the coordinates may include the distance of line of sight 720, an angle to SES 115 relative to base station 110, and an elevation (e.g., height) value of SES 115.

In an embodiment, base station 110 may function as a full dimensional multiple input multiple output (FD-MIMO) system. Accordingly, base station 110 may use a precoding matrix to process the multiple channels for improving throughput in accordance with FD-MIMO operation. Beamforming techniques may apply weights (e.g., complex numbers which include phase information) to elements in antenna array 395 to perform nulling as described above. The weights may be calculated prior to operation of base station 110 because the position and/or orientation of SES 115 is known. The weights may be determined and subsequently incorporated into the precoding matrix. Incorporating the weights into the precoding matrix improves the efficiency of the operation of base station 110.

In an embodiment, an exemplary analytical model of the radiation amplitude of antenna array 395 may be based on the following equation:

$$Rx(\theta) = \mathrm{Re}\left\{e^{i2\pi ft}\left(\frac{1 - e^{iN\frac{2\pi d\cos(\theta)}{\lambda}}}{1 - e^{i\frac{2\pi d\cos(\theta)}{\lambda}}}\right)\right\}. \quad (2)$$

In Equation (2) above, $Rx(\theta)$ is the radiation amplitude of antenna pattern 710; $\theta$ is the angle with respect to the base station (e.g., angle in horizontal plane); Re is the operator which takes only the real part of a complex expression; f is the frequency of the signal transmitted by base station 110; t is the time value of the signal transmitted by base station 110; N is the number of elements in antenna array 395; d is the distance between elements in antenna array 395; and $\lambda$ is the wavelength of the signal transmitted by base station 110.

Figure 8:
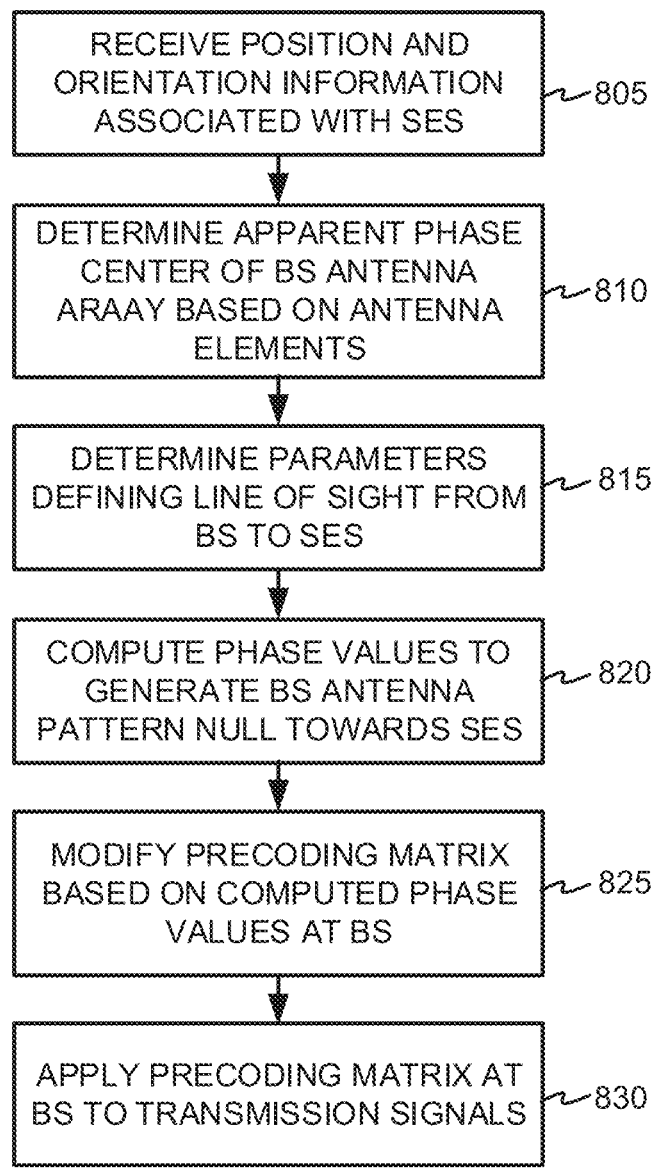
FIG. 8 is a flow chart showing an exemplary process for mitigating interference using zero forcing.

FIG. 8 is a flow chart of an exemplary process 800 mitigating interference with SES 115 from base station 110 using zero forcing. In an embodiment, process 800, or portions thereof, may execute on processor 320 residing in base station 110. Additionally or alternatively, process 800, or portions thereof, may execute on processor 420 residing in IMD 122. As shown in FIG. 8, a processor 320/420 may receive position and/or orientation information associated with SES 115 (Block 805). In an embodiment, the position may include coordinates of SES 115 in a standard coordinate system (e.g., WGS84). The orientation may include the attitude (e.g., multi-dimensional pointing) of the dish antenna associated with SES 115. Processor 320/420 may then receive and/or calculate the apparent phase center of antenna array 395 (Block 810). The apparent phase center is a location associated with antenna array 395 from which the electromagnetic radiation spreads outward in a semispherical manner, with the phase of the signal being equal at any point on the semi-sphere. The apparent phase center of antenna array 395 may be determined analytically knowing the positions of the antenna elements. Processor 320/420 may determine parameters defining the line of sight from the base station 110 to SES 115 (Block 815). The parameters may include the distance of the line of sight, and angles of line of sight relative to base station 110. Processor 320/420 and/or antenna controller 380 may determine phase values associated with the elements of antenna array 395 for steering and/or forming null in the antenna pattern along the line of sight 720 in the direction of SES 115. At base station 110, processor 320 may modify the precoding matrix based on the phase values determined in Block 820 (Block 825). Processor 320 and/or antenna controller 830 may apply the precoding matrix to transmission signals for generating the MIMO signals and nulling the antenna pattern along the line of sight 720 in the direction of SES 115 (Block 830).

Figure 9:
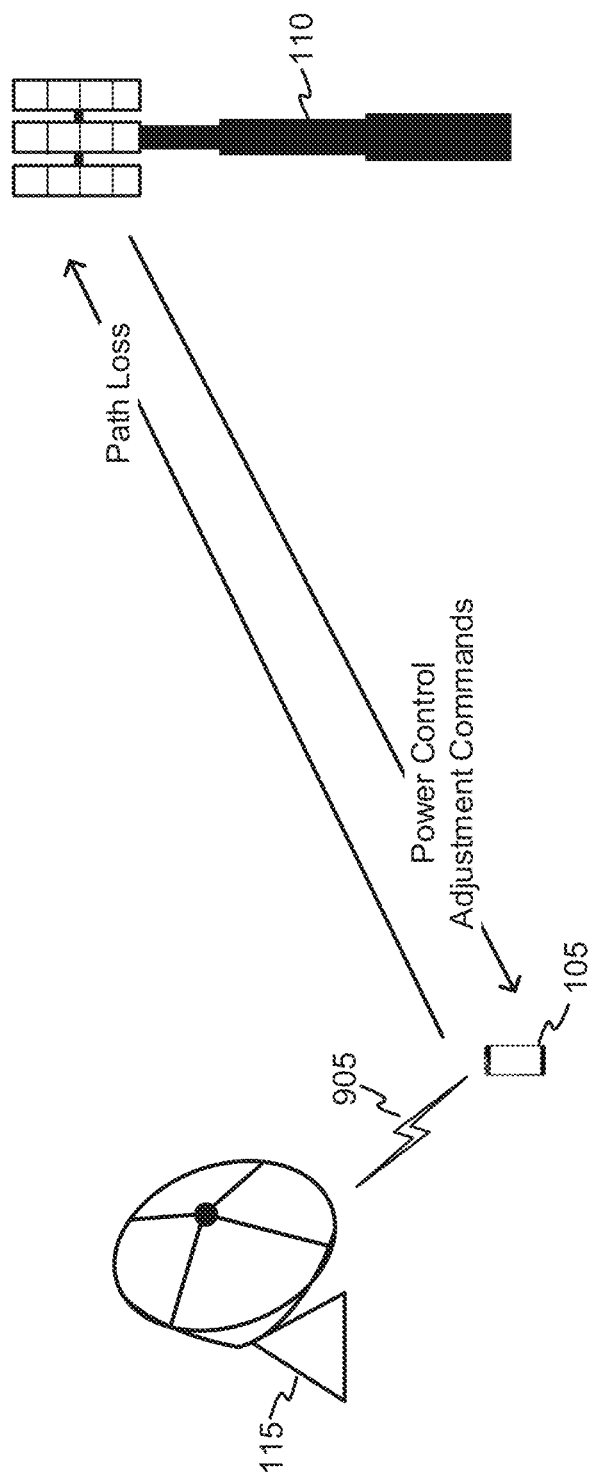
FIG. 9 is a diagram depicting an embodiment for mitigating interference between an SES and a base station based on mobile device power control by the base station.

FIG. 9 is a diagram depicting an embodiment for mitigating interference 905 with SES 115 from mobile device 105 using base station power control. Base station power control relies on base station 110 reducing the transmit power of mobile device 105 in sectors known to include one or more SES's 115. In an embodiment, on a sector basis, base station 110 may determine whether mobile device 105 is within a proximity of SES 115. Upon determining that mobile device 105 is within a predetermined threshold of SES 115, base station 110 may send power control commands to mobile device 105 to reduce transmit power, and thus reduce interference emissions 905 into SES 115. In order to determine when mobile device 105 is in proximity to SES 115, base station may compare the path loss value associated with SES 115 and the path loss value associated with mobile device 105. When the path loss values of SES 115 and mobile device 105 are within a predetermined threshold, SES 115 and mobile device 105 may be assumed to be within a close enough proximity such that the transmissions of mobile device 105 may create interference emissions 905 with SES 115 that may interfere with the reception of satellite transmissions by SES 115. The path loss value of SES 115 may be determined based on a model using known propagation analysis techniques. The path loss of SES 115 may be determined by IMD 122 and/or base station 110 prior to performing interference mitigation. In an embodiment, path loss values may be stored in a database for access by base station 115 and/or IMD 122. The path loss value between mobile device 105 and base station 110 may be sent by mobile device 105 to base station 110 over the wireless communications channel.

In more detail, based on 3GPP standards, base station 110 may control the transmit power of mobile device 105. In an embodiment, power control may be performed based on the following equation:

$$P\_PUSCH(i) = \min\{P\_CMAX, 10 \log(M\_PUSCH(i)) + P\_O\_PUSCH(j) + \alpha(j)PL + \text{Delta\_TF}(i) + f(i)\} \quad (3).$$

In Equation (3) above, P_PUSCH(i) may be the physical uplink shared channel for subframe number i; P_CMAX may be the maximum power that mobile device 105 may transmit; M_PUSCH(i) may be the number of resource blocks allocated to mobile device 105 for subframe number i; P_O_PUSCH(j) may be a nominal value for the transmission power of the physical uplink shared channel for scheduling grant type j (j may be 0 or 1); alpha(j) may be the path loss exponent in a path loss model; PL may be the path loss value between mobile device 105 and base station 110; Delta_TF(i) may be system setting for subframe number i; and f(i) may be a system setting for subframe number i.

In an embodiment, to alter the transmit power behavior of mobile device 105 when in proximity to SES 115, base station may adjust PL and/or alpha(j) parameters in Equation 3. By reducing the transmit power of mobile device 105 through the standard power control techniques (e.g., via Equation 3), the interference with SES 115 may be mitigated.

Figure 10:
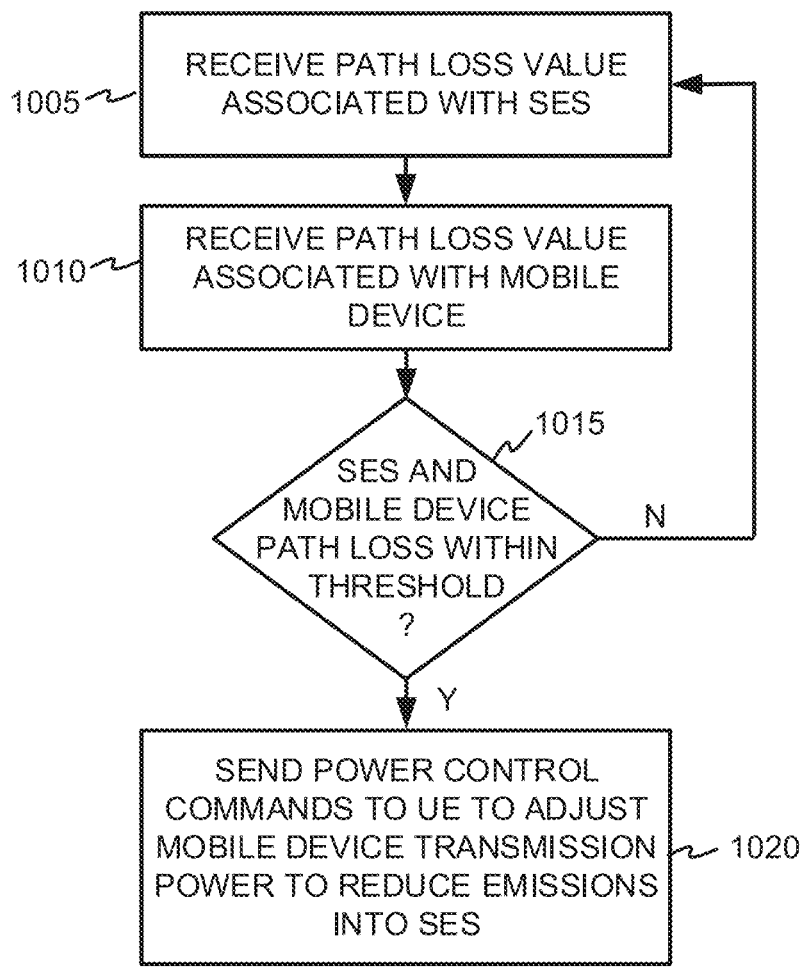
FIG. 10 is a flow chart showing an exemplary process for mitigating interference using mobile device power control by the base station.

FIG. 10 is a flow chart of an exemplary process 1000 for mitigating interference 905 with SES 115 from mobile device 105 using base station power control. In an embodiment, process 1000, or portions thereof, may execute on processor 320 residing in base station 110. Additionally or alternatively, process 1000, or portions thereof, may execute on processor 420 residing in IMD 122. Referring to FIG. 10, in an embodiment, processor 320 may receive path loss values between SES 115 and base station 110 (Block 1005). The path loss values associated with SES 115 may be generated for each sector. In an embodiment, the path loss values for the SES 115 may be determined for a sector using a propagation model which may be performed by IMD 115. Once determined, the path loss for SES 115 may be provided to base station 110 via WAN 119 and/or 5G core 117. Alternatively, processor 320 may perform the propagation model to determine the pass loss values associated with SES 115 within a sector.

Processor 320 may receive a path loss value between mobile device 105 and base station 110 (Block 1010). The path loss value associated with mobile device 105 may be sent over the wireless communications channel. Processor 320 may compare the path loss values of the mobile device 105 and SES 115 to determine if the values are within a predetermined threshold (Block 1015). The comparison in Block 1015 determines whether mobile device 105 and SES 115 are in within a proximity where mobile device 105 transmission may interfere with SES 115 reception.

When Block 1015 determines that mobile device 105 and SES 115 are in within a proximity where mobile device 105 transmission may interfere with SES 115 reception (Block 1015—YES), processor 320 may send power control commands to mobile device 105 in order to adjust the transmission power of mobile device 105 to reduce emissions into SES 115 (Block 1020). When Block 1015 determines that mobile device 105 and SES 115 are not in within a proximity where mobile device 105 transmission may interfere with SES 115 reception (Block 1015—NO), processor 320 may return control to Block 1005.

Figure 11:
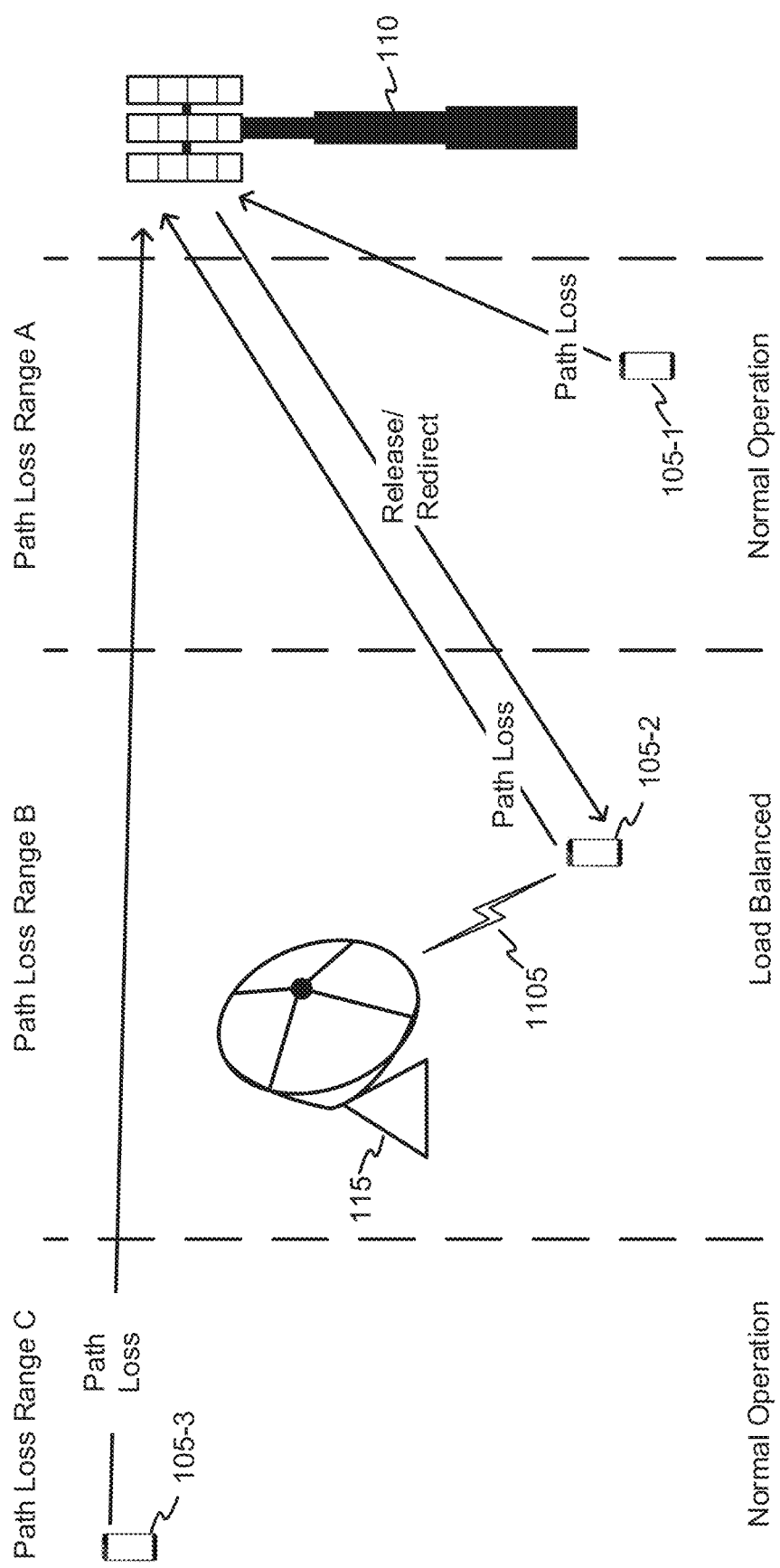
FIG. 11 is a diagram depicting an embodiment for mitigating interference between an SES and a base station using path loss-based load balancing.

FIG. 11 is a diagram depicting an embodiment for mitigating interference 1105 with SES 115 from mobile device 105 using load balancing based on path loss. Within each sector, designated ranges of path loss values may be associated with the presence of an SES 115. For example, as shown in FIG. 11, path loss values for a sector may be designated as being divided into three ranges: A, B, and C. For example, path loss range C may be 115-130 dB; path loss range B may be 110-115 dB; and path loss range A may be 95-110 dB. As shown in the example illustrated in FIG. 11, path loss range B may be associated with SES 115, and path loss ranges A and C are not associated with an SES 115. The designation of path loss ranges A, B, and C may be performed prior to performing interference mitigation, where the path loss ranges may be calculated based on propagation analysis. The propagation analysis may include, for example, a model that uses the position and/or attitude of SES 115. In an embodiment, IMD 122 may calculate the path loss ranges A, B, and C and provide them to base station 110 via WAN 119 and/or 5G core 117. Alternatively, the designation of path loss ranges A, B, and C within each sector may be performed by base station 110.

Figure 12:
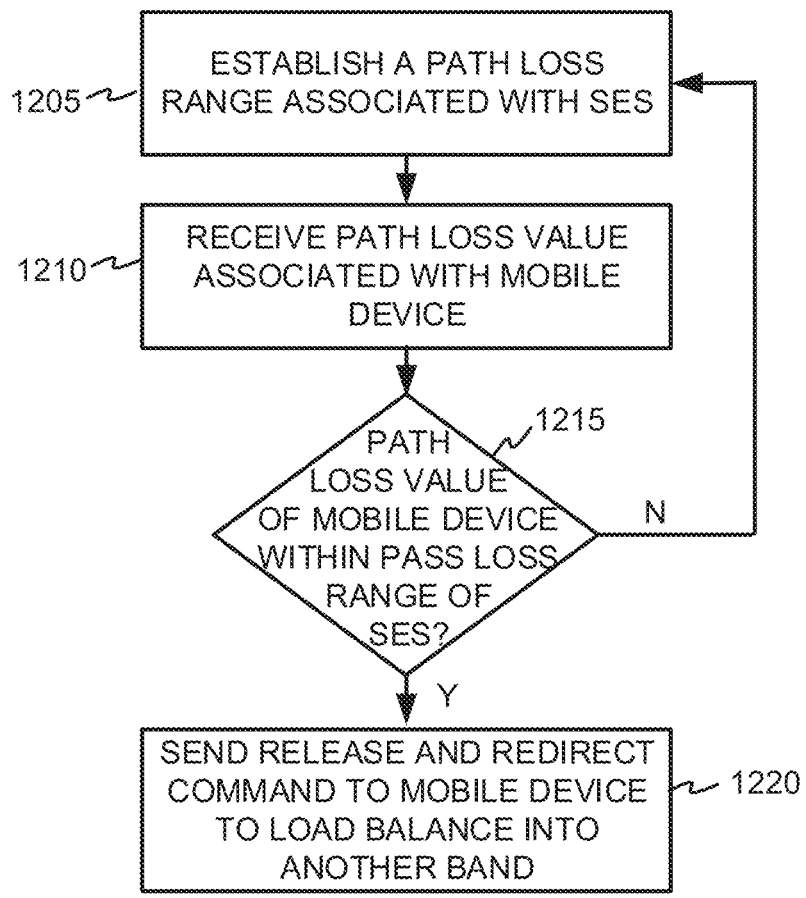
FIG. 12 is a flow chart showing an exemplary process mitigating interference using path loss-based load balancing.

Further referring to FIG. 11, base station 110 may receive path loss values from mobile devices 105-1 through 105-3. Base station 110 may perform an analysis to determine whether any of the path loss values received from mobile devices 105-1, 105-2, and 105-3 lie within path loss range B, which is associated with the presence of SES 115. Upon determining that the path loss value for mobile device 105-2 is within path loss range B, base station 110 will send a load balancing command to mobile device 105-2. In an embodiment, the load balancing command may be a "release and redirect command" which changes the frequency band of operation of mobile device 105-2, and moves the operation of mobile device 105-2 out of the frequency range of operation of SES 115 (e.g., move mobile device 105-2 out of C-band), thus mitigating the interference 1105 caused by mobile device 105-2. As mobile devices 105-1 and 105-3 have path loss values that lie within ranges (path loss ranges A and C, respectively) that are not associated with an SES 115, base station 110 will not send load balancing commands to mobile device 105-1 and 105-3, thus allowing them to maintain normal operation. FIG. 12 is a flow chart of an exemplary process 1200 for mitigating interference 1105 with satellite station 115 from mobile device 105 using load balancing based on path loss. In an embodiment, process 1200, or portions thereof, may execute on processor 320 residing in base station 110. Additionally or alternatively, process 1200, or portions thereof, may execute on processor 420 residing in IMD 122. As shown in FIG. 12, in an embodiment, processor 320 may establish a path loss range associated with SES 115 (Block 1205). The path loss range may be established by calculation, on a per sector basis, using propagation analysis based on parameters (e.g., distance and/or one or more angles with respect to base station 110) associated with SES 115. The various parameters may be determined prior to subsequent interference mitigation processing. For example, the path loss range, an azimuth angle relative to a sector, and/or an elevation angle may be determined by the wireless network a priori (e.g., prior to receiving the path loss between the mobile device and the base station). In another example, the path loss range, the azimuth angle, and/or the elevation angles may be determined for each sector associated with base station 110, and stored in a database within the wireless network In one embodiment, the path loss range associated with SES may be determined by base station 115. Alternatively, the path loss range may be determined by a network device having access to 5G core 117. For example, the path loss range associated with SES 115 may be determined by IMD 122, and provided to base station 115 via WAN 119 and/or 5G core 117. The path loss range values may be stored in a database for access by base station 115. Particularly, in an embodiment, the path loss range may be determined for each sector associated with the base station and stored in a database within the wireless network on a per-sector basis.

Further referring to FIG. 12, processor 320 may receive a path loss value associated with mobile device 105 (Block 1210). The path loss associated with mobile device 105 may be measured and/or calculated by mobile device 105, and sent to base station 110 via cellular uplink 130. Processor 320 may then determine whether the path loss value of mobile device 105 is within the path loss range associated with SES 115 that was established in Block 1205 (Block 1215). When the path loss value received from mobile device 105 is within the path loss range associated with SES 115 (Block 1215—YES), processor 320 may send a message to mobile device 105 which changes an operation of mobile device 105 (Block 1220). If it is determined in Block 1215 that the path loss value of mobile device 105 is not within the path loss range (Block 1215—NO), control may be returned to Block 1205.

In an embodiment, as shown in FIG. 12, the message sent in Block 1220 may include a command to mobile device 105 that affects load balancing within the wireless network. In particular, processor 320 may send a message that includes a "release and redirect command" to change the frequency of operation of the mobile device 105. Specifically, the release and redirect command may cause mobile device 105 to change operation from C-band (the frequency band in which SES 115 operates) to a different frequency band, thus mitigating interference caused by mobile device 105.

In summary, an embodiment for mitigating inference in networking environment 100 may include establishing a range of path loss values for SES 115 with respect to base station 110 based on propagation analysis. Base station 110 may then receive path loss values, determined by mobile devices 105, which characterize the quality of wireless channels established between mobile device 105 and base station 110. The path loss values may be provided by mobile devices 105 to base station 110 via a cellular uplink 130. The embodiment may further include base station 110 determining whether any of the received path loss values are within the established range of path loss values.

Upon determining the received path loss values are within the established range of path loss values, base station 110 may send a message via a cellular downlink 135 to the one or more mobile device(s) 105 having the appropriate path loss value. The message may include a command that alters the operation of the one or more mobile device(s) 105 to mitigate interference with the satellite earth station 115. In an embodiment, the command may alter load balancing within the wireless network by having base station 110 send a "release and redirect" command to cause a mobile device 105 to change operation from C-band to a different frequency band.

Figure 13:
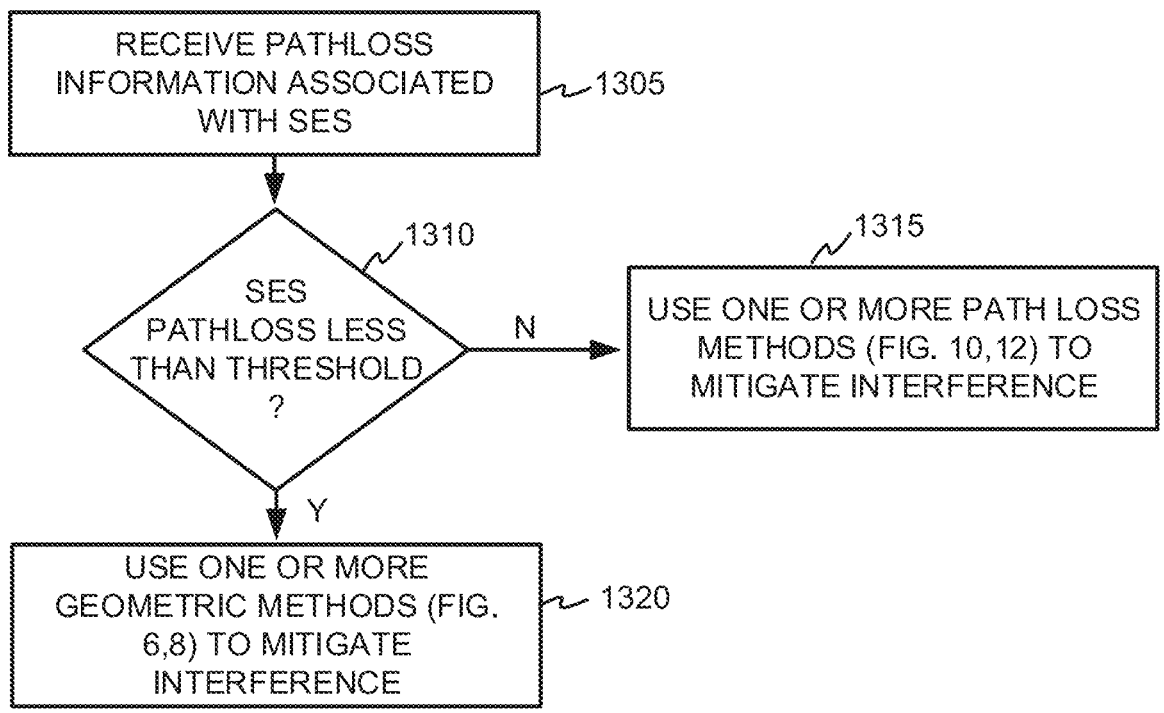
FIG. 13 is a flow chart showing an exemplary process for mitigating interference using a combination of techniques determined by path loss values associated with the SES.

FIG. 13 is a flow chart of an exemplary process 1300 of combining various embodiments for mitigating interference based on the pass loss value associated with SES 115. Process 1300, or portions thereof, may execute on processor 320 residing in base station 110. Additionally or alternatively, process 1300, or portions thereof, may execute on processor 420 residing in IMD 122. As shown in FIG. 13, in an embodiment, processor 320 may receive path loss values associated with SES 115 (Block 1305). The path loss values associated with SES 115 may be generated for each sector. In an embodiment, the path loss values for the SES 115 may be determined for a sector using a propagation model which may be performed by IMD 115. Once determined, the path loss for SES 115 may be provided to base station 110 via WAN 119 and/or 5G core 117. Alternatively, processor 320 in base station 110 may perform the propagation model to determine the pass loss values associated with SES 115 within a sector.

Processor 320 may determine if the path loss value associated with SES 115 is less than a predetermined threshold (Block 1310). In an embodiment, a predetermined threshold may be 95 dB. If processor 320 determines that the path loss associated with SES is less than the threshold (Block 1310—YES), it would imply that base station 110 is the network device causing the greatest amount of interference with SES 115. Accordingly, mitigation techniques directed to reducing base station 110 interference would be appropriate. Accordingly, processor 320 may mitigate interference using beam omission (e.g., process 600 shown in FIG. 6) and/or zero forcing (e.g., process 800 shown in FIG. 8) (Block 1320).

If processor 320 determines that the path loss associated with SES is greater than or equal to the threshold (Block 1310—NO) (e.g., the threshold being 95 dB), it would imply that mobile device 105 is the network device causing the greatest amount of interference with SES 115. Accordingly, mitigation techniques directed to reducing mobile device 105 interference would be appropriate. Accordingly, processor 320 may mitigate interference using base station power control (e.g., process 1000 shown in FIG. 10) and/or load balancing based on path loss (e.g., process 1200 shown in FIG. 12) (Block 1315).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6, 8, 10, 12, and 13, the order of the blocks may be modified in other embodiments. Further, non-dependent messaging and/or processing blocks may be performed in parallel.

To the extent the aforementioned embodiments collect, store, or employ personal information provided by of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise. No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   establishing a path loss range associated with a satellite earth station included in a satellite system, wherein the path loss range is determined by a wireless network for a sector associated with a base station within the wireless network;
   receiving a path loss value associated with a mobile device included in the wireless network;
   determining whether the path loss value is within the path loss range; and
   sending a message to the mobile device to change an operation of the mobile device in response to determining that the path loss value is within the path loss range.

2. The method of claim 1, further comprises:
   sending a command to the mobile device that affects load balancing within the wireless network.

3. The method of claim 2, wherein the command comprises:
   providing a release and redirect command to change a frequency of operation of the mobile device.

4. The method of claim 3, wherein the release and redirect command causes the mobile device to change operation from a first frequency band to a different frequency band.

5. The method of claim 1, wherein the path loss range and azimuth and elevation angles are determined by the wireless network prior to receiving the path loss value between the mobile device and the base station.

6. The method of claim 5, wherein the path loss range is determined based on propagation analysis.

7. The method of claim 5, wherein the path loss range and azimuth and elevation angles are determined for each sector associated with the base station and stored in a database within the wireless network.

8. A base station, comprising:
   a network interface;
   an antenna array configured to generate an antenna pattern;
   an antenna controller, coupled to the antenna array, configured to manipulate the antenna pattern;
   a memory configured to store instructions; and
   a processor coupled to the network interface, the antenna controller, and the memory, wherein the processor is configured to execute the instructions stored in the memory to:
   establish a path loss range associated with a satellite earth station included in a satellite system, wherein the path loss range is determined by a wireless network for a sector associated with the base station within the wireless network, receive a path loss value associated with a mobile device included in the wireless network,
   determine whether the path loss value is within the path loss range, and
   send a message to the mobile device to change an operation of the mobile device in response to determining that the path loss value is within the path loss range.

9. The base station of claim 8, wherein the instructions to send a message to the mobile device further cause the processor to:
   send a command to the mobile device that affects load balancing within the wireless network.

10. The base station of claim 9, wherein the instructions to send the command to affect the load balancing further cause the processor to:
    provide a release and redirect command to change a frequency of operation of the mobile device.

11. The base station of claim 10, wherein the release and redirect command causes the mobile device to change operation from C-band to a different frequency band.

12. The base station of claim 8, wherein the path loss range and azimuth and elevation angles are determined by the wireless network prior to receiving the path loss value between the mobile device and the base station.

13. The base station of claim 12, wherein the path loss range is determined based on propagation analysis.

14. The base station of claim 12, wherein the path loss range and azimuth and elevation angles are determined for each sector associated with the base station and stored in a database within the wireless network.

15. A non-transitory computer-readable medium comprising instructions, which, when executed by a processor, cause the processor to:
    establish a path loss range associated with a satellite earth station included in a satellite system, wherein the path loss range is determined by a wireless network for a sector associated with a base station within the wireless network;
    receive a path loss value associated with a mobile device included in the wireless network;
    determine whether the path loss value is within the path loss range; and
    send a message to the mobile device to change an operation of the mobile device in response to determining that the path loss value is within the path loss range.

16. The non-transitory computer-readable medium of claim 15, wherein the instructions to send a message to the mobile device further cause the processor to:
    send a command to the mobile device that affects load balancing within the wireless network.

17. The non-transitory computer-readable medium of claim 16, wherein the instructions to send the command to affect the load balancing further cause the processor to:
    provide a release and redirect command to change a frequency of operation of the mobile device.

18. The non-transitory computer-readable medium of claim 17, wherein the release and redirect command causes the mobile device to change operation from C-band to a different frequency band.

19. The non-transitory computer-readable medium of claim 15, wherein the path loss range and azimuth and elevation angles are determined by the wireless network prior to receiving the path loss value between the mobile device and the base station.

20. The non-transitory computer-readable medium of claim 19, wherein the path loss range is determined based on propagation analysis.

\* \* \* \* \*